United States Patent [19]

Derolf

[11] 3,935,023

[45] Jan. 27, 1976

[54] ALUMINA DISPERSIONS

[75] Inventor: Mahlon Robert Derolf, Blackwood, N.J.

[73] Assignee: Philadelphia Quartz Company, Valley Forge, Pa.

[22] Filed: Oct. 8, 1974

[21] Appl. No.: 513,199

Related U.S. Application Data

[63] Continuation of Ser. No. 383,879, July 30, 1973.

[52] U.S. Cl. ............................ 106/308 B; 106/288 B
[51] Int. Cl.² .......................................... C08K 3/22
[58] Field of Search ............. 106/308 B, 288, 309; 423/625, 626

[56] References Cited
UNITED STATES PATENTS

| | | | |
|---|---|---|---|
| 2,590,833 | 4/1952 | Bechtold | 423/631 |
| 2,787,522 | 4/1957 | Lefrancois | 423/631 |
| 2,915,475 | 12/1959 | Bugosh | 106/288 B |
| 3,357,791 | 12/1967 | Napier | 260/448 AD |

Primary Examiner—Winston A. Douglas
Assistant Examiner—J. V. Howard
Attorney, Agent, or Firm—Ernest G. Posner

[57] ABSTRACT

Stable aqueous dispersions of alumina are formed at concentrations of above about 18% to about 26% on a weight basis by dispersing alumina in a hydrochloric acid solution where the $Al_2O_3/HCl$ parts by weight ratio is maintained between 54 and 65 pbw of $Al_2O_3$/1 pbw of HCl.

19 Claims, No Drawings

ALUMINA DISPERSIONS

This is a continuation of application Ser. No. 383,879, filed on July 30, 1973.

It has been known for many years that the application of dispersions of finely divided silica or sols of silica to paper surfaces increases the friction between those surfaces. More recently it has been found that the use of dispersions or aerosols of alumina increases friction even more and that such aerosol alumina is more strongly attached to the paper so that the non-slip characteristics is maintained through three or four passes, even though less alumina is required. For instance, an uncoated paper may have an angle of repose of 29° to 35° in a standard slip testing device. The same paper, treated with a dispersion of colloidal silica may have an angle of repose of 39° to 41°, and often better results may be obtained using a lower concentration of alumina as the treating liquid than is necessary for silica. These angles depend to a large degree on the particular paper employed.

It is well known that aerosols of alumina are very expensive compared to sols or dispersions of finely divided alumina. Precipitated colloidal alumina or alumina gel, dispersed with strong acid at about a pH of 3 is approximately equivalent to the aerosol alumina in performance, but it cannot be formed into dispersions of above about 10% $Al_2O_3$ which are stable for more than about one week. These are not really satisfactory for commercial use. It has also been known to increase the stability of such dispersions by partially removing the acid ions by ion exchange resins. These are also not sufficiently stable at concentrations above about 16% $Al_2O_3$.

I have found that stable dispersions can be formed at concentrations up to about 26% $Al_2O_3$ by preparing an aqueous solution of HCl and then adding to this solution, with vigorous mixing, sufficient alumina to form a dispersion having a concentration of about 54 to 65 pbw of $Al_2O_3$ per pbw of HCl. The pH of an 18 to 26% dispersion while preferably between 3.8 to 4.1 can range between 3.5 to 4.2. An 18% dispersion will have a viscosity of about 4 to 6 centipoises at 25°C and a 26% dispersion will have a viscosity of 5 to 7 centipoises at 25°C.

Mixing of the HCl solution and $Al_2O_3$ can take place at any temperature up to the boiling point of the dispersion, but for simplicity of processing equipment I prefer to operate between 20° and 80°C. Pressure has no notable influence on the process, and mixing between 0.5 and 5 atmospheres is acceptable while I prefer to operate at atmospheric pressure.

When an 18% $Al_2O_3$ dispersion is desired as the end product, I have found it necessary to maintain an $Al_2O_3$ to HCl ratio of 54 to 61 pbw of $Al_2O_3$ to 1 pbw of HCl. When it is desired to obtain a 26% $Al_2O_3$ dispersion, I found it necessary to maintain an $Al_2O_3$ to HCl ratio of 58 to 65 pbw of $Al_2O_3$ to 1 pbw of HCl. When more than 66 pbw $Al_2O_3$ are present per pbw of HCl there is a tendency for the alumina to be less dispersible yielding a product that is unsatisfactory. When less than 53 pbw $Al_2O_3$ per pbw of HCl is utilized in the dispersion mix the shelf life of the resulting product having at least 18% $Al_2O_3$ is drastically limited, for example, a dispersion of 18% $Al_2O_3$ prepared from a mixture having 50 pbw $Al_2O_3$ to 1 pbw HCl will have a shelf life of only 20 days.

The shelf life of this dispersion containing 18 to 26% $Al_2O_3$ when made from a mixture having the afore described $Al_2O_3$/HCl ratio will be a minimum of 6 months and can be over one year.

In general, this dispersion is diluted before use to about 1 to 5% $Al_2O_3$ although much higher concentrations may be used.

Generally the application is about 0.05 to 0.3 pounds of alumina solids per 1000 square feet of paper or paperboard.

For untreated bags or boxes, which start to slip at 25°, the angle may be raised to 40° before slippage if the surface is treated with at least 0.15 pounds of alumina per thousand square feet, whereas the use of colloidal silica usually requires at least about 0.3 pounds per thousand square feet to achieve the same value.

This dispersion may be applied by known methods. The usual methods of application of prior art dispersions are the use of a sponge, a felt, a contact roller or spraying. These methods of application are all suitable for the dispersion of my invention.

If dispersions prepared according to the methods of my invention should become dried on the apparatus used in application or on work areas, the dried material can be redispersed in water facilitating cleanup of such apparatus and areas.

It has further been found that a dispersion of my invention wherein the ratio of $Al_2O_3$ to HCl is maintained between 53 and 66 pbw $Al_2O_3$ per pbw of HCl can be dried and redispersed in water at a later time when ready for use. The drying can take place by any known process for removing the water so long as the conditions do not affect the pbw balance between $Al_2O_3$/HCl. Examples of suitable methods of drying include tray drying, spray drying, double drum drying, freeze drying and vacuum evaporation. Rotary dryers and fluid bed dryers are also suitable. An advantage of this drying process is that the resulting powder can be more easily handled and stored than can the dispersion. The shelf life on redispersion is equal to that of the original dispersion, i.e., greater than 6 months for the redispersed powder having 18 to 26% $Al_2O_3$ in the dispersion. The dispersion may be frozen and rethawed without notable deterioration to the dispersion when reliquified. The advantage of freezing the dispersion is that this is a method whereby the shelf life can be extended indefinitely. The time during which said dispersion is frozen does not cause any deterioration and the 6 month minimum shelf life only begins to run when the material is thawed. A separation of some solids may occur during the freeze-thaw cycle, however, the dispersion can be returned to its original characteristic through vigorous agitation.

The following examples describe in general the process of preparing these dispersions and their use on paper. These examples are illustrative and are not to be construed as restrictive of the invention.

In the following examples I have used a form of alumina which I will call "Alumina A". It has a particle size in solution of about 5 mu. This alumina contains about 90% alumina monohydrate and about 10% water by weight. Impurities in this system total less than 0.9%. The surface area is by the BET method and is approximately 150 to 250 square meters per gram.

EXAMPLE 1

In this example a 10% dispersion was prepared using the prior art procedure. Thus an acid solution containing 0.8 pbw of concentrated HCl (37%) and 89.2 pbw of water was prepared at a pH of 1.2. To this was added, with moderate agitation, 10 pbw of the Alumina A described above. Mixing was continued for 15 minutes. A stable dispersion was prepared which had a pH of 2.3 at 1 hour and stabilized at 3.3 in 24 hours. After 7 weeks, the dispersion was very viscous, but could be redispersed in water.

EXAMPLE 2

A dispersion containing 18% $Al_2O_3$ was prepared according to the invention as follows: 75.6 pbw of water were mixed thoroughly with 0.9 pbw HCl (37.5%) to form an aqueous acid solution. 25 parts of Alumina A was added slowly to this acidic solution while vigorously agitating. The agitation was continued for about 15 to 20 minutes after the addition of alumina was complete. The opaque dispersion had a pH of 3.8 and the ratio of $Al_2O_3$/HCl on a parts by weight basis was 54/1. The viscosity of this dispersion is 5.4 centipoises at 25°C. The dispersion is still stable after a period of 10 months storage at room temperature.

A dispersion was made by the same method with somewhat less acid at 18% $Al_2O_3$ and a pbw of $Al_2O_3$/HCl of 61/1. The pH of this dispersion was 4.05 and the viscosity at 25°C was 4.7 cps. The dispersion is still stable after one year storage at room temperature.

A dispersion was made by the same method at 18% $Al_2O_3$ and a ratio of $Al_2O_3$/HCl of 58/1. The pH of this dispersion was 3.95 and the viscosity was 5.0 cps. The dispersion is still stable after 11 months storage at room temperature.

EXAMPLE 3

A dispersion was made according to method of Example 2 with the following composition: 66.3 pbw of $H_2O$, 1.03 pbw HCl (37.5%) and 32.7 parts Alumina A. The opaque dispersion had a concentration of 25% $Al_2O_3$ and the $Al_2O_3$/HCl ratio was 65/1. The pH was 4.1 and the viscosity was 5.6 cps at 25°C. The dispersion is still stable after 7 months storage at room temperature.

Dispersions were also made at 25% $Al_2O_3$ with $Al_2O_3$/HCl ratios of 63/1 and 58/1 by the method of Example 2. These opaque dispersions had pH values of 4.05 and 3.9 respectively. The viscosities were 5.9 and 6.6 cps at 25°C. Both dispersions are still stable after 6 months storage at room temperature.

Slide angle tests were made of these products. These tests were carried out by the standard TAPPI Method 815su72.

Paper was pre-conditioned at 73°F and 50% relative humidity. The dispersions were diluted from 1 to 5% $Al_2O_3$ depending on the amount of coating required, and this dilute dispersion of alumina was applied to the paper with a sponge. After coating, the treated paper was again conditioned at 73°F and 50% relative humidity for 24 hours. Sections of the treated paper were cut to fit the slide angle tester. The slide angle was measured according to the standard method by raising the tester with a constant speed motor at a rate of 1.5° per second. The paper was placed in cross-grained position. The angle of inclination was observed at the point when the weight began to slide. The first two slides are run to precondition the surface and the third slide is the determined value.

A colloidal silica as well as the dispersion prepared in this example were diluted to 2% solids, applied to paper and tested for slide angle as described above. The slide angle determined with the colloidal silica was 34.5° while the slide angle with the dispersions of the example were between 36° and 37.5°. It was found that these test samples were coated with approximately 0.1 pounds solids per 1000 square feet of paper surface. Loadings on the paper surface were determined by measuring the amount of liquid pick-up for a given area of paper coated.

EXAMPLE 4

A dispersion was made according to Example 2 with the following composition: 64.9 pbw of water, 1.07 parts HCl(37.5%) and 34.0 parts Alumina A. The opaque dispersion had a concentration of 26% $Al_2O_3$ and the $Al_2O_3$/HCl ratio was 65/1. The pH was 4.1 and the viscosity was 5.7 cps. The dispersion is still stable after 5 months storage at room temperature.

EXAMPLE 5

The dispersion of Example 2 was dried in a laboratory spray dryer with an inlet temperature of 370°C and an outlet temperature of 125°C. The resulting powder was totally redispersible and the $Al_2O_3$/HCl ratios were 54, 58 and 61/1. The properties and stabilities of these dispersions made by reslurrying this dried powder were the same as the original dispersions as shown in Example 2.

The dispersions of Example 2 were also dried in an evaporator at temperatures of 60°–80°C. The products of this drying process were equivalent to those of the spray dried powder.

The redispersible powders were aged at room temperature for 6 months and redispersed. The stabilities of these dispersions were the same as those of the original dispersions.

EXAMPLE 6

The dispersions of Example 3 were frozen and thawed with no apparent effect upon properties and stability of the material. Frozen samples of the dispersion were retained for 8 months and thawed. The stabilities of these dispersions were the same as those given in Example 3.

In addition to the examples described herein, other variations within the scope of the invention and the depending claims would occur to those skilled in the art and must be regarded as within the scope of the invention.

Alumina itself is suitable for use in the preparation of the dispersions of my invention provided it is of a size less than 200 mu and preferably less than 100 mu.

20 parts by weight of alumina is agitated vigorously with a water-HCl solution containing 80 parts by weight of an HCl-water solution having 0.33 pbw HCl therein is agitated with 20 pbw alumina resulting in a stable dispersion containing 20% $Al_2O_3$.

I claim:

1. A method of preparing stable aqueous dispersions of alumina at concentrations of about 18 to 26% $Al_2O_3$ onn a weight basis, consisting essentially of:
   1. preparing an aqueous solution of hydrochloric acid, 2. controlling the temperature below the boiling point of the dispersion,
3. maintaining the pressure between 0.5 to 5 atmospheres,
4. adding alumina to said aqueous solution such that the weight ratio of alumina to HCl is 53 to 66 parts alumina to 1 part HCl and the $Al_2O_3$ is 18 to 26% of the total mixture, and
5. simultaneously agitating said mixture to obtain the desired dispersion.

2. The method of claim 1 in which the concentration of $Al_2O_3$ is 54 to 65 pbw per 1 pbw of HCl.

3. The method of claim 1 in which the concentration of $Al_2O_3$ is 18% and the ratio of $Al_2O_3$ is 54 to 61 pbw of $Al_2O_3$ per 1 pbw of HCl.

4. The method of claim 1 in which the concentration of $Al_2O_3$ is 26% and the ratio of $Al_2O_3$ to HCl is 58 to 65 pbw of $Al_2O_3$ per 1 pbw of HCl.

5. The method of claim 1 in which the temperature is maintained between 20° and 80°C.

6. The method of claim 1 in which the pressure is atmospheric.

7. The method of claim 5 in which the pressure is atmospheric.

8. The method of claim 2 wherein the alumina introduced into said mixture is in the form of alumina monohydrate.

9. The dispersion of alumina produced by the method of claim 1 in which the pH is between 3.5 and 4.2 and the stability is greater than 6 months.

10. A dispersion of alumina with a concentration of $Al_2O_3$ between 18 and 26%, a ratio of $Al_2O_3$ to HCl of 53 to 66 pbw of $Al_2O_3$ per 1 pbw of HCl and a pH of 3.5 to 4.2.

11. A dried powder having therein 53 to 66 pbw $Al_2O_3$ per 1 pbw HCl prepared by drying the dispersion of claim 10 under conditions that do not alter the $Al_2O_3$—HCl ratio.

12. The dispersion of claim 10 with an $Al_2O_3$ concentration of 18% and a ratio of $Al_2O_3$ to HCl of 54 to 61 pbw of $Al_2O_3$ per 1 pbw of HCl with a shelf life of 6 to 12 months.

13. The dispersion of claim 10 with an $Al_2O_3$ concentration of 26% $Al_2O_3$ and a ratio of $Al_2O_3$ to HCl of 58 to 65 pbw of $Al_2O_3$ per 1 pbw of HCl with a shelf life of 6 months.

14. The dispersion of claim 10 with a pH of 3.8 to 4.1.

15. In the known process of forming an aqueous alumina dispersion comprising forming an aqueous solution of HCl and then adding alumina, the improvement being that concentrations of 18 to 26% $Al_2O_3$ on a weight basis having stability for at least 6 months are obtained by maintaining the ratio of $Al_2O_3$ to HCl in the dispersion at 53 to 66 pbw of $Al_2O_3$ per 1 pbw of HCl and the pH at 3.5 to 4.2.

16. The process of claim 15 in which the pH is 3.8 to 4.1.

17. The process of claim 15 in which the weight concentration of $Al_2O_3$ in the dispersion is 18% and the $Al_2O_3$ to HCl ratio is 54 to 61 pbw of $Al_2O_3$ per 1 pbw of HCl.

18. The process of claim 15 in which the weight concentration of $Al_2O_3$ in the dispersion is 26% and the $Al_2O_3$ to HCl ratio is 58 to 65 pbw of $Al_2O_3$ per 1 pbw of HCl.

19. The process of claim 15 in which the $Al_2O_3$ to HCl ratio of the dispersion is 54 to 65 pbw of $Al_2O_3$ per 1 pbw of HCl.

* * * * *